United States Patent
Jeong et al.

(10) Patent No.: US 10,270,083 B2
(45) Date of Patent: Apr. 23, 2019

(54) NEGATIVE ELECTRODE FOR LITHIUM SECONDARY BATTERY, METHOD OF MANUFACTURING THE SAME AND LITHIUM SECONDARY BATTERY USING THE SAME

(71) Applicant: KOREA ELECTRONICS TECHNOLOGY INSTITUTE, Seongnam-si, Gyeonggi-do (KR)

(72) Inventors: Goojin Jeong, Seongnam-si (KR); Youngjun Kim, Seongnam-si (KR); Hansu Kim, Seoul (KR); Juhye Song, Seoul (KR)

(73) Assignee: Korea Electronics Technology Institute, Gyeonggi-Do (KR)

( * ) Notice: Subject to any disclaimer, the term of this patent is extended or adjusted under 35 U.S.C. 154(b) by 175 days.

(21) Appl. No.: 15/368,476

(22) Filed: Dec. 2, 2016

(65) Prior Publication Data
US 2018/0090743 A1 Mar. 29, 2018

(30) Foreign Application Priority Data
Sep. 29, 2016 (KR) .......... 10-2016-0125468

(51) Int. Cl.
| | |
|---|---|
| H01M 4/04 | (2006.01) |
| H01M 4/36 | (2006.01) |
| H01M 4/38 | (2006.01) |
| H01M 4/62 | (2006.01) |
| H01M 4/134 | (2010.01) |
| H01M 10/0525 | (2010.01) |

(52) U.S. Cl.
CPC ......... *H01M 4/0483* (2013.01); *H01M 4/134* (2013.01); *H01M 4/366* (2013.01); *H01M 4/382* (2013.01); *H01M 4/628* (2013.01); *H01M 10/0525* (2013.01)

(58) Field of Classification Search
CPC .......... H01M 4/0483; H01M 10/0525; H01M 4/628; H01M 4/366; H01M 4/382
USPC ...................................... 429/231.95
See application file for complete search history.

(56) References Cited

U.S. PATENT DOCUMENTS 6,699,623 B1 * 3/2004 Dai .................. H01M 4/663
429/231.1

FOREIGN PATENT DOCUMENTS

| JP | 2008-501213 A | 1/2008 |
|---|---|---|
| KR | 10-2016-0099458 | 8/2016 |

OTHER PUBLICATIONS

Office Action received in Korean Patent Application No. 10-2016-0125468, dated Jan. 31, 2018.

* cited by examiner

*Primary Examiner* — Gary D Harris
(74) *Attorney, Agent, or Firm* — Knobbe, Martens, Olson & Bear, LLP

(57) ABSTRACT

The present invention relates to a negative electrode for a lithium secondary battery that can ensure a high energy density, a long-life characteristic, and stability by forming a film on a negative electrode for a lithium secondary battery and thus suppressing dendrites during electrodeposition, a method of manufacturing the same, and a lithium secondary battery using the same. The method of manufacturing the negative electrode for a lithium secondary battery according to the present invention includes preparing a sulfur dioxide-based sodium molten salt and forming a protective layer on the surface of a current collector by immersing the current collector in the sulfur dioxide-based sodium molten salt.

11 Claims, 2 Drawing Sheets

(a)  (b)

(a)  (b)

NEGATIVE ELECTRODE FOR LITHIUM SECONDARY BATTERY, METHOD OF MANUFACTURING THE SAME AND LITHIUM SECONDARY BATTERY USING THE SAME

CROSS-REFERENCE TO RELATED APPLICATION

This application claims priority to and the benefit of Korean Patent Application No. 10-2016-0125468 filed in the Korean Intellectual Property Office on Sep. 29, 2016 respectively, the entire contents of which are incorporated herein by reference.

The present invention relates to a motor, and more particularly, to a lithium secondary battery, and more specifically, to a negative electrode for a lithium secondary battery that can ensure a high energy density, a long-life characteristic, and stability by forming a film on a negative electrode for a lithium secondary battery and thus suppressing dendrites when charging and discharging are performed, a method of manufacturing the same, and a lithium secondary battery using the same.

With the growth of the IT mobile market, demand for secondary batteries is increasing, and the applications of secondary batteries to electric vehicles and energy storage systems are gradually expanding. In particular, in order to realize a battery having a high energy density such as an electric vehicle battery and the like, it is necessary to develop a next generation lithium battery having an energy density equal to or greater than a maximum energy density of a lithium ion battery (250 Wh/kg). One of the secondary batteries that fully satisfy the above requirement is a lithium secondary battery.

A lithium secondary battery refers to a secondary battery using a lithium metal as a negative electrode, and is being researched and developed in various forms such as a lithium-air battery, a lithium-sulfur battery, or the like.

Lithium has a very low standard reduction potential of −3.045 V (SHE: standard hydrogen electrode), a relatively high specific gravity of 1.85 cm3/g, and an energy density of 3860 mAh/g per weight, which is at least 10 times higher than that of a currently commercialized carbon negative electrode (372 mAh/g), and thus is an ideal material for a high energy density battery. However, when a lithium metal is used as a negative electrode of a secondary battery, there are the following problems.

First, since a lithium metal is highly reactive with a component of an electrolyte solution, when a lithium metal comes in contact with an electrolyte solution, a passivation layer is formed on the surface of a lithium metal due to spontaneous decomposition of an electrolyte. Such a layer causes a local difference in current density, and thus when charging is performed, a non-uniform current distribution is caused and simultaneously a dendritic lithium dendrite is formed. Also, when the dendrite thus formed continuously grows and thus comes in contact with a positive electrode through a separator, a phenomenon in which a battery explodes is caused by occurrence of an internal short circuit. Second, since lithium is an alkali metal that is highly reactive with moisture, when moisture is included in an amount of about several ppm in an electrolyte, heat and gas may be generated as lithium reacts with moisture, and accordingly the inside of the battery is expanded, which causes a problem in stability of the battery. Third, since lithium has high ductility and poor mechanical strength, when lithium is used without additional surface treatment, a very poor handling property is exhibited. Therefore, the technology for suppressing formation of a dendrite of a lithium metal electrode is a key technology that must be an antecedent for development of the next generation lithium secondary battery.

PRIOR-ART DOCUMENT

Patent Document

Korean Patent Publication No. 2016-0099458 (Aug. 22, 2016)

The present invention is directed to providing a negative electrode for a lithium secondary battery that can ensure a high energy density, a long-life characteristic, and stability by suppressing formation of a dendrite occurring in a lithium metal electrode, a method of manufacturing the same, and a lithium secondary battery using the same.

One aspect of the present invention provides a method of manufacturing a negative electrode for a lithium secondary battery according to the present invention, which includes preparing a sulfur dioxide-based sodium molten salt and forming a protective layer on the surface of a current collector by immersing the current collector in the sulfur dioxide-based sodium molten salt.

In the method of manufacturing a negative electrode for a lithium secondary battery according to the present invention, in the formation of a protective layer, the current collector may include a lithium metal.

In the method of manufacturing a negative electrode for a lithium secondary battery according to the present invention, in the preparation of a molten salt, the sulfur dioxide-based sodium molten salt may include $NaAlCl_4$-$2SO_2$ or $NaGaCl_4$-$2SO_2$.

In the method of manufacturing a negative electrode for a lithium secondary battery according to the present invention, the preparation of a molten salt may include preparing a solid salt by mixing NaCl and $AlCl_3$ or $GaCl_3$ and preparing a liquid-phase sulfur dioxide-based sodium molten salt by providing $SO_2$ to the solid salt.

In the method of manufacturing a negative electrode for a lithium secondary battery according to the present invention, in the formation of a protective layer, the protective layer may be formed on the surface of the lithium metal and be a film including Na, Cl, or S.

Another aspect of the present invention provides a negative electrode for a lithium secondary battery according to the present invention, which includes a current collector and a protective layer formed on the surface of the current collector by immersing a lithium metal in a sulfur dioxide-based sodium molten salt.

In the negative electrode for a lithium secondary battery according to the present invention, the current collector may include a lithium metal.

In the negative electrode for a lithium secondary battery according to the present invention, the sulfur dioxide-based sodium molten salt may include $NaAlCl_4$-$2SO_2$ or $NaGaCl_4$-$2SO_2$.

In the negative electrode for a lithium secondary battery according to the present invention, the sulfur dioxide-based sodium molten salt may be formed by mixing NaCl and $AlCl_3$ or $GaCl_3$ to form a solid salt and then providing $SO_2$ to the solid salt.

In the negative electrode for a lithium secondary battery according to the present invention, the protective layer may be formed on the surface of the lithium metal and be a film including Na, Cl, or S.

Still another aspect of the present invention provides a lithium secondary battery according to the present invention, which includes a negative electrode for a lithium secondary battery having a current collector and a protective layer formed on the surface of the current collector by immersing the current collector in a sulfur dioxide-based sodium molten salt.

According to the present invention, in a method of manufacturing a negative electrode for a lithium secondary battery, a lithium metal is immersed in a sulfur dioxide-based sodium molten salt to form a protective layer on the surface of the lithium metal, and therefore formation of a dendrite occurring in a negative electrode can be suppressed, thereby ensuring a high energy density, a long-life characteristic, and stability.

DETAILED DESCRIPTION

In the following description, detailed descriptions of well-known functions or constructions will be omitted since they would obscure the invention in unnecessary detail.

It should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Hereinafter, exemplary embodiments of the present invention will be described in detail.

Figure 1:
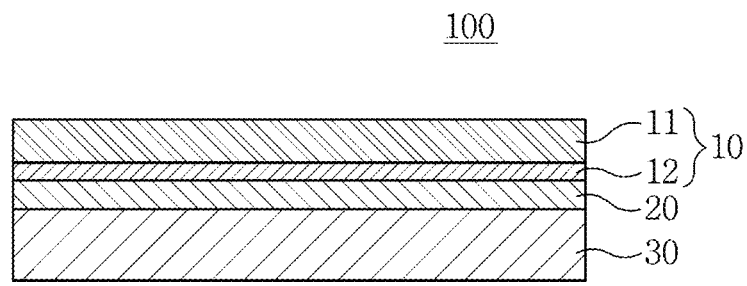
FIG. 1 is a diagram illustrating a lithium secondary battery according to the present invention.

FIG. 1 is a diagram illustrating a lithium secondary battery according to the present invention.

Referring to FIG. 1, in a lithium secondary battery 100 according to the present invention, a negative electrode 10 and a positive electrode 30 are disposed on each side of a separator 20, and an electrolyte is interposed between the negative electrode 10 and the positive electrode 30.

The positive electrode 30 may include a lithium transition metal oxide such as $LiMO_2$ (M=V, Cr, Co, or Ni), $LiM_2O_4$ (M=Mn, Ti, or V), $LiMPO_4$ (M=Co, Ni, Fe, or Mn), $LiNi_{1-x}Co_xO_2$ (0<x<1), $LiNi_{2-x}Mn_xO_4$ (0<x<2), $Li[NiMnCo]O_2$, and the like or a sulfur compound as a positive electrode active material. Alternatively, a porous air electrode may be used as the positive electrode active material. Such a positive electrode active material may have a layered structure, a spinel structure, or an olivine structure in accordance with the type of a used active material.

The electrolyte may be a liquid electrolyte or a solid electrolyte. In particular, when a liquid electrolyte is used, the separator 20 for containing an organic electrolyte solution may be provided between the negative electrode 10 and the positive electrode 30.

An organic electrolyte solution contains a lithium salt and an organic solvent. As a non-limiting example, a lithium salt may be selected from lithium hexafluorophosphate ($LiPF_6$), lithium perchlorate ($LiClO_4$), lithium tetrafluoroborate ($LiBF_4$), lithium trifluoromethanesulfonate ($LiCF_3SO_3$), lithium hexafluoroarsenate ($LiAsF_6$), lithium bis(trifluoromethanesulfonyl)imide (LiTFSI), lithium bis(oxalato)borate (LiBOB), and a mixture of two or more thereof. As a non-limiting example, an organic solvent may be selected from ethylene carbonate, propylene carbonate, ethyl methyl carbonate, dimethyl carbonate, diethyl carbonate, ethyl propionate, and a mixture of two or more thereof. An organic solvent may be a solvent in which dimethyl carbonate (DC), ethyl methyl carbonate (EMC), or the like is added to a base solvent including ethylene carbonate (EC) or propylene carbonate (PC).

The separator 20 may be disposed between the negative electrode 10 and the positive electrode 30. The separator 20 may include at least one selected from a polyolefin-based resin, a fluorine-based resin, a polyester-based resin, a polyacrylonitrile-based resin, or a microporous film made of a cellulose-based material, and may be coated with an inorganic material such as a ceramic. For example, the polyolefin-based resin may include polyethylene, polypropylene, and the like, the fluorine-based resin may include polyvinylidene fluoride, polytetrafluoroethylene, and the like, and the polyester-based resin may include polyethylene terephthalate, polybutylene terephthalate, and the like.

The negative electrode 10 according to the present invention includes a current collector 11 and a protective layer 12.

Here, the current collector 11 may be a lithium (Li) metal or, alternatively, may be a copper (Cu) material, a carbon material, or the like. For example, the carbon material may be graphite, hard carbon, or the like.

The protective layer 12 is applied on the surface of the current collector 11, and thus the growth of a dendrite on the surface of the current collector 11 may be suppressed. Also, the protective layer 12 may be a film including Na, Cl, or S.

Such a protective layer 12 may be formed by immersing a current collector in a sulfur dioxide-based sodium molten salt.

The sulfur dioxide-based sodium molten salt has a molar ratio (x) of a $SO_2$ content of 0.5 to 10, preferably, 1.5 to 3.0 based on a sodium salt. When a molar ratio (x) of a $SO_2$ content is less than 1.5, ionic conductivity of an electrolyte decreases, and when a molar ratio (x) of a $SO_2$ content is greater than 3.0, vapor pressure of an electrolyte increases. As a sodium salt, $NaAlCl_4$, $NaGaCl_4$, $Na_2CuCl_4$, $Na_2MnCl_4$, $Na_2CoCl_4$, $Na_2NiCl_4$, $Na_2ZnCl_4$, $Na_2PdCl_4$, and the like may be used. Among these various sodium salts, $NaAlCl_4$ exhibits relatively excellent characteristics of a battery. In a method of preparing a sulfur dioxide-based inorganic electrolyte solution 1, $SO_2$ gas is injected into a mixture of NaCl and $AlCl_3$ (or only a $NaAlCl_4$ salt) to obtain a sulfur dioxide-based inorganic electrolyte solution.

Such a protective layer 12 suppresses formation of a dendrite during electrodeposition and thus the lithium secondary battery 100 may ensure a high energy density, a long-life characteristic, and stability.

The lithium secondary battery 100 may be manufactured at constant room temperature in a dry room or a glovebox with an inert gas atmosphere for minimizing an effect of moisture and an active gas in air.

When the battery is manufactured in the form of a coin cell, the positive electrode 30, the separator 20, and the negative electrode 10 are disposed by a laminating method, and when the battery is manufactured in a polygonal form or circular form, a winding method or a laminating method may be used. Next, tabs of the positive electrode 30 and negative electrode terminals, which are paths for external electron flow, are attached. After packaging, an electrolyte is injected thereinto and sealed in a vacuum to complete the manufacture of the lithium secondary battery.

Hereinafter, a method of manufacturing a negative electrode for a lithium secondary battery according to the present invention will be described.

Figure 2:
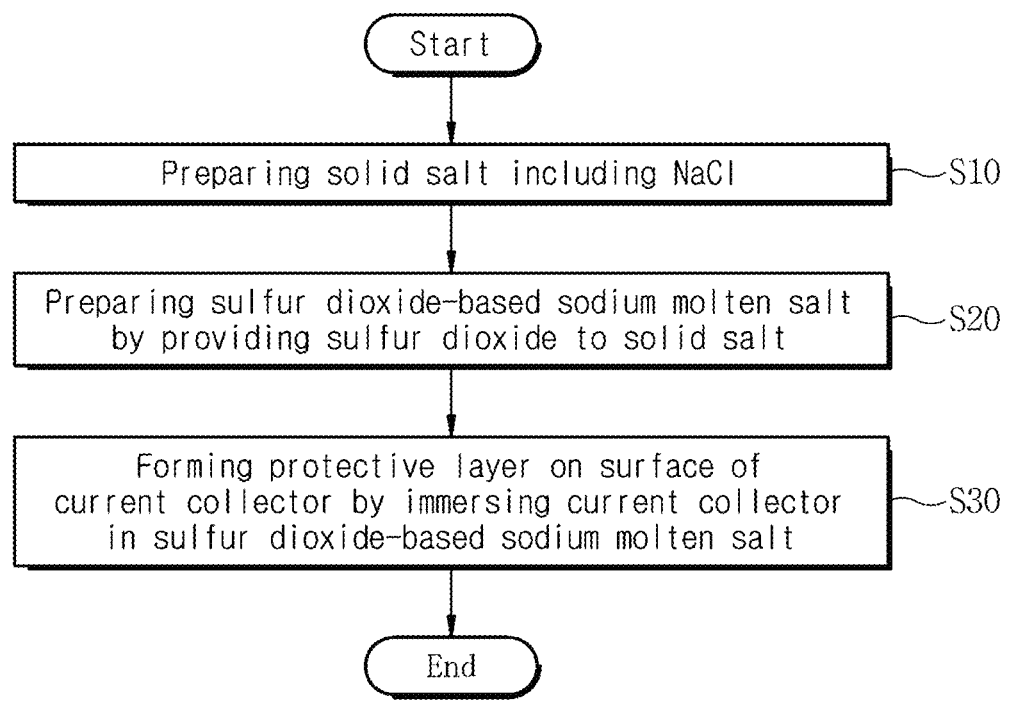
FIG. 2 is a flowchart illustrating a method of manufacturing a negative electrode for a lithium secondary battery according to the present invention.

FIG. 2 is a flowchart illustrating a method of manufacturing a negative electrode for a lithium secondary battery according to the present invention.

Referring to FIG. 2, in an S10 operation of a method of manufacturing a negative electrode for a lithium secondary battery according to the present invention, NaCl and $AlCl_3$ or $GaCl_3$ are mixed to form a solid salt.

Next, in an S20 operation, $SO_2$ is provided to the solid salt to prepare liquid-phase sulfur dioxide-based sodium molten salt.

Next, in an S30 operation, a current collector is immersed in the prepared sulfur dioxide-based sodium molten salt to form a protective layer on the surface of the current collector.

Here, the current collector may be a lithium (Li) metal or, alternatively, may be a copper (Cu) material, a carbon material, or the like. For example, the carbon material may be graphite, hard carbon, or the like.

The protective layer formed in the S30 operation may be a film including Na, Cl, or S.

Accordingly, in the method of manufacturing a negative electrode for a lithium secondary battery according to the present invention, a lithium metal is immersed in a sulfur dioxide-based sodium molten salt to form a protective layer on the surface of the lithium metal, and thus formation of a dendrite occurring in a negative electrode may be suppressed, thereby ensuring a high energy density, a long-life characteristic, and stability.

Figure 3:
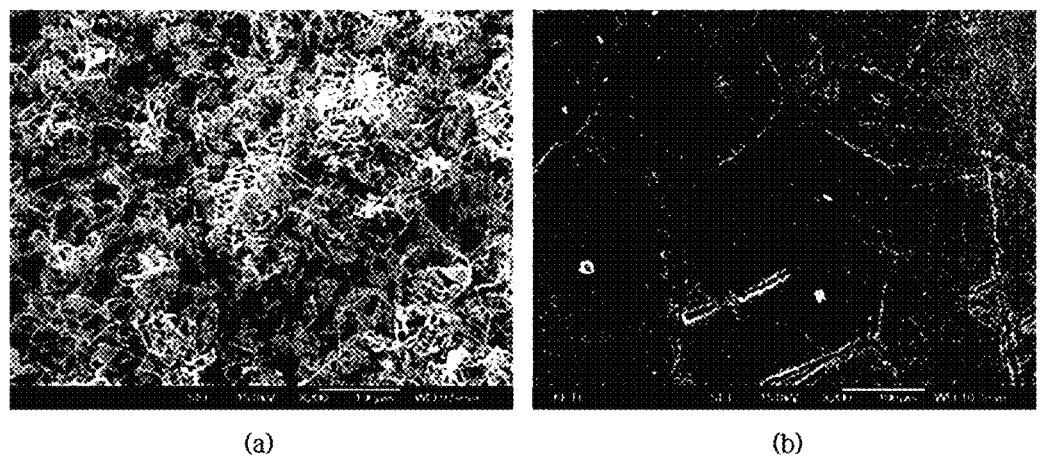
FIG. 3 illustrates SEM images of the surfaces of negative electrodes for a lithium secondary battery according to an example of the present invention and a comparative example.

FIG. 3 illustrates SEM images of the surfaces of negative electrodes for a lithium secondary battery according to an example of the present invention and a comparative example.

EXAMPLE

NaCl and $AlCl_3$ were mixed to prepare a solid salt and $SO_2$ was provided to the formed solid salt to prepare $NaAlCl_4$-$2SO_2$. Next, a lithium metal was immersed in the prepared $NaAlCl_4$-$2SO_2$ solution to modify the surface of the lithium metal and then a lithium secondary battery was manufactured using the lithium metal whose surface was modified as a negative electrode.

Comparative Example

A lithium secondary battery was manufactured using a lithium metal whose surface was not treated as a negative electrode.

Referring to FIG. 3, as a result obtained by observing SEM images of lithium secondary batteries that were manufactured according to an example and a comparative example under the same conditions except for a difference in negative electrodes and then were charged and discharged three times, it can be seen that a severe dendritic electrodeposited form (a dendrite) was observed in the case of a comparative example, as shown in FIG. 3A, whereas the negative electrode of the lithium secondary battery according to an example of the present invention in which the surface was treated exhibits a flat surface structure after electrodeposition, as shown in FIG. 3B.

That is, it can be seen that the lithium secondary battery according to an example of the present invention uses, as a negative electrode, a lithium metal whose surface has a protective layer formed by being immersed in a sulfur dioxide-based sodium molten salt, and thus formation of a dendrite occurring in the negative electrode may be suppressed.

Accordingly, the lithium secondary battery according to an example of the present invention may ensure a high energy density, a long-life characteristic, and stability by suppressing formation of a dendrite occurring in the negative electrode.

Figure 4:
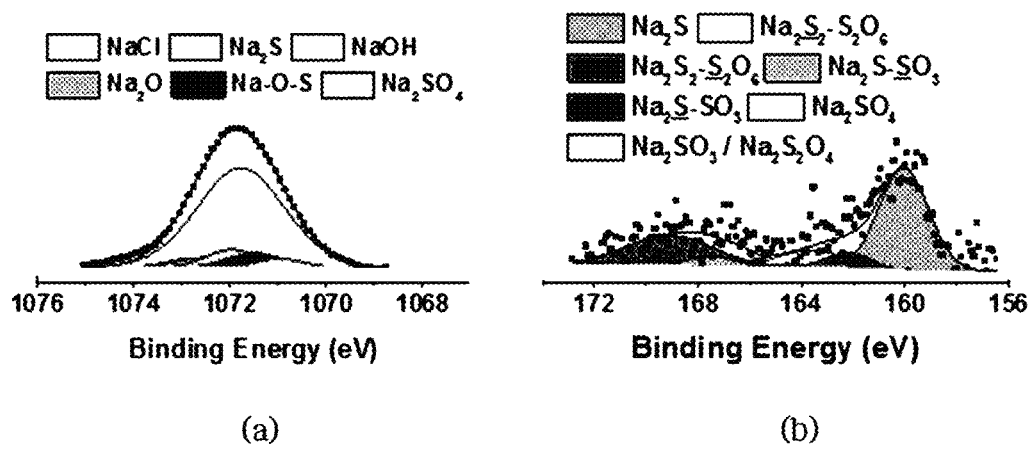
FIG. 4 is a graph illustrating a result of XPS surface analysis of a negative electrode for a lithium secondary battery according to an example of the present invention.

FIG. 4 is a graph illustrating a result of XPS surface analysis of a negative electrode for a lithium secondary battery according to an example of the present invention.

FIG. 4A is a graph illustrating a result of Na is XPS of the negative electrode for a lithium secondary battery according to an example of the present invention, and FIG. 4B is a graph illustrating a result of S 2p XPS thereof.

Referring to FIGS. 4A and 4B, it can be seen that the negative electrode for a lithium secondary battery according to an example of the present invention exhibited Na 1s, S 2p, and Cl 2p on the surface of a lithium metal, and the surface was composed of NaCl, $Na_2S$, and $NaS_xO_y$, as main compounds.

In the method of manufacturing a negative electrode for a lithium secondary battery according to an example of the present invention, a lithium metal is immersed in a sulfur dioxide-based sodium molten salt to form a protective layer on the surface of the lithium metal, and thus formation of a dendrite occurring in a negative electrode may be suppressed, thereby ensuring a high energy density, a long-life characteristic, and stability.

The embodiments disclosed in drawings are only examples to help understanding of the invention and the invention is not limited there to. It is clear to those skilled in the art that various modifications based on the technological scope of the invention in addition to the embodiments disclosed herein can be made.

In this specification, exemplary embodiments of the present invention have been classified into the first, second and third exemplary embodiments and described for conciseness. However, respective steps or functions of an exemplary embodiment may be combined with those of another exemplary embodiment to implement still another exemplary embodiment of the present invention.

What is claimed is:

1. A method of manufacturing a negative electrode for a lithium secondary battery, the method comprising:
   preparing a sulfur dioxide-based sodium molten salt; and
   forming a protective layer on the surface of a current collector by immersing the current collector in the sulfur dioxide-based sodium molten salt.

2. The method according to claim 1, wherein, in the formation of a protective layer, the current collector includes a lithium metal.

3. The method according to claim 1, wherein, in the preparation of a sulfur dioxide-based sodium molten salt, the sulfur dioxide-based sodium molten salt includes NaAlCl$_4$-xSO$_2$ (1.5≤x≤3.0) or NaGaCl$_4$-xSO$_2$ (1.5≤x≤3.0).

4. The method according to claim 3, wherein the preparation of a sulfur dioxide-based sodium molten salt comprises:
preparing a solid salt by mixing NaCl and AlCl$_3$ or GaCl$_3$; and
preparing a liquid-phase sulfur dioxide-based sodium molten salt by providing SO$_2$ to the solid salt.

5. The method according to claim 4, wherein, in the formation of a protective layer, the protective layer is formed on the surface of the lithium metal and is a film including Na, Cl, or S.

6. A negative electrode for a lithium secondary battery, comprising:
a current collector; and
a protective layer formed on the surface of the current collector by immersing the current collector in a sulfur dioxide-based sodium molten salt.

7. The negative electrode for a lithium secondary battery according to claim 6, wherein the current collector includes a lithium metal.

8. The negative electrode for a lithium secondary battery according to claim 6, wherein the sulfur dioxide-based sodium molten salt includes NaAlCl$_4$-xSO$_2$ (1.5≤x≤3.0) or NaGaCl$_4$-xSO$_2$ (1.5≤x≤3.0).

9. The negative electrode for a lithium secondary battery according to claim 8, wherein the sulfur dioxide-based sodium molten salt is formed by mixing NaCl and AlCl$_3$ or GaCl$_3$ to form a solid salt and then providing SO$_2$ to the solid salt.

10. The negative electrode for a lithium secondary battery according to claim 9, wherein the protective layer is formed on the surface of the lithium metal and is a film including Na, Cl, or S.

11. A lithium secondary battery comprising a negative electrode for a lithium secondary battery including a current collector and a protective layer formed on the surface of the current collector by immersing the current collector in a sulfur dioxide-based sodium molten salt.

* * * * *